Oct. 10, 1967     H. B. NEWCOMER     3,346,263
AIR BRAKE COUPLING COMPONENTS
Filed Nov. 16, 1964     2 Sheets-Sheet 1
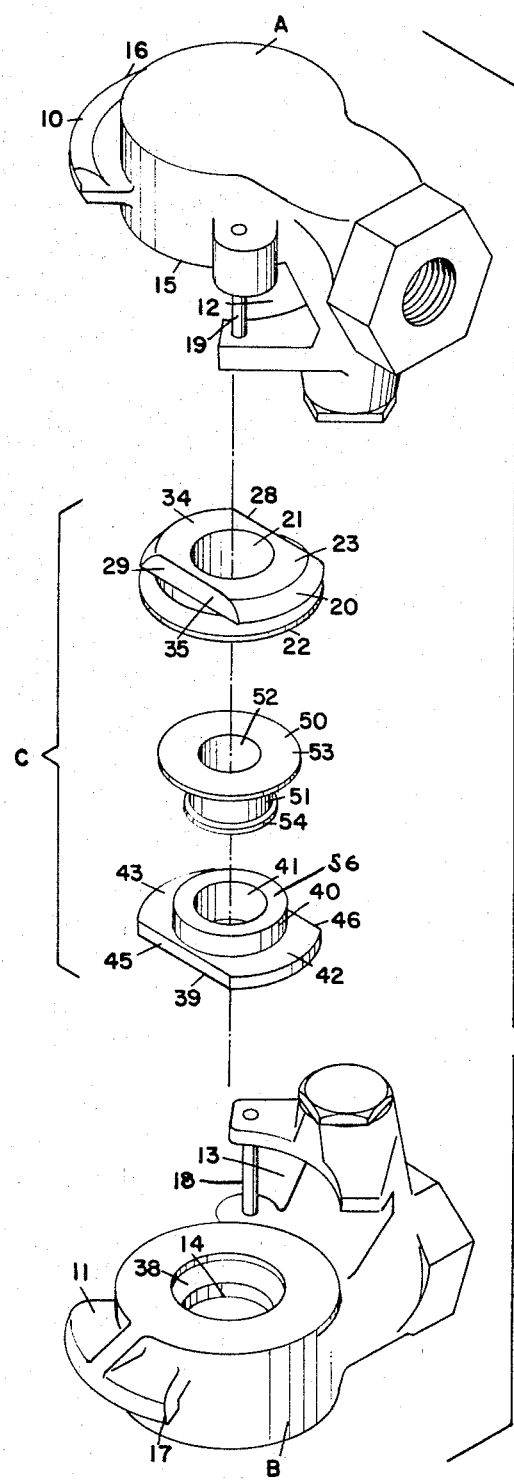
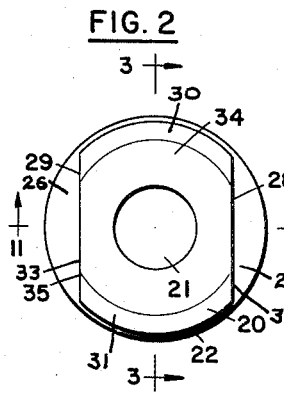
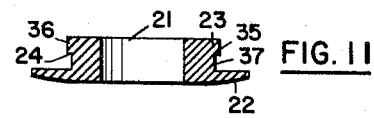
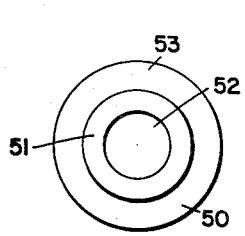
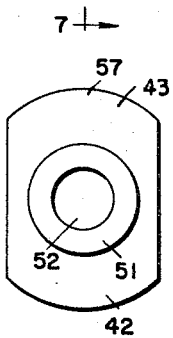
INVENTOR.
HAROLD B. NEWCOMER
BY Karl L. Spivak
ATTORNEY.

Oct. 10, 1967  H. B. NEWCOMER  3,346,263
AIR BRAKE COUPLING COMPONENTS
Filed Nov. 16, 1964  2 Sheets-Sheet 2

*INVENTOR.*
HAROLD B. NEWCOMER
BY Karl L Spivak
ATTORNEY.

United States Patent Office 3,346,263
Patented Oct. 10, 1967

3,346,263
AIR BRAKE COUPLING COMPONENTS
Harold B. Newcomer, 4200 Aldine St.,
Philadelphia, Pa. 19136
Filed Nov. 16, 1964, Ser. No. 411,319
8 Claims. (Cl. 277—81)

This invention relates to the general field of air brake couplings and is more particularly directed to a rubber grommet and a metal disc adapted for use with existing equipment that serves both to prolong the life of the present coupling components and to build in positive safety features to minimize the possibility of coupling failure.

The invention is directed to the air brake systems of large motor trucks and railroad equipment. At the point where a tractor and its trailer are joined or where two railroad cars are coupled, the air brake hose systems must also be joined. This is usually accomplished by attaching the respective hose ends to right and left matching couplings, each carrying a sealing rubber grommet securely within its structure. Inasmuch as air brake systems function at relatively high pressures, the grommets must be held in face to face relationship under enormous pressure to prevent leakage. This pressure is achieved through identical inclined, wedge-like paths provided in each of the mating couplings whereby a rotary movement serves to draw the couplings together along the inclined paths compressing the grommets therebetween.

While the system presently in use is for the large part satisfactory, experience has shown that frequently, the grommets will fail and thus allow loss of air pressure. When this occurs, the usual remedy is to simply replace the grommets and continue operation. Such a procedure has certain dangers however, as there is no assurance that the failure will occur when the joint is made up. Should the grommet rupture when the vehicle is in actual operation, the results of such a failure could prove extremely serious.

Since the rubber grommet is softer than the metal coupling, normal wear may be expected and most mechanics make periodic grommet replacements in the interest of routine safety precautions. Because of the construction of the couplings now in use and the shape of the grommets normally inserted, mechanics have been faced with the common difficulty of installation. In view of the pressures that must be maintained, the grommets must necessarily be constructed to be a tight fit within the coupling or else blowouts could result. It is the very closeness of the fit that causes the trouble in installation.

It is therefore an object of this invention to provide a grommet of unique configuration to simplify insertion within a hose coupling.

It is another object of this invention to provide a rubber grommet of unique configuration that is compatable for use with presently available air hose couplings.

It is another object of this invention to provide a novel grommet wherein the unique configuration serves to allow easy installation without the chance of damage to the grommet itself.

It is another object of this invention to provide a metal working member for use with the usual rubber grommets within air hose couplings.

It is another object of this invention to provide a unique rubber to metal to rubber air seal within an air brake coupling.

It is another object of this invention to provide novel air brake coupling component arranged to strengthen rubber grommets within an air hose coupling.

It is another object of this invention to provide a novel air brake metal disc within a coupling and arranged to prevent the possibility of grommet rupture.

It is another object nf this invention to provide novel air hose coupling components that are inexpensive in manufacture, easy in application and trouble-free upon operation.

Other objects and advantages of my invention will be apparent from the following specification and reference to the accompanying drawings.

The invention consists in the details of construction, the combination and arrangement of parts as will hereinafter be more fully described, illustrated in the accompanying drawings, which disclose preferred embodiments of the invention, and pointed out in the claims hereunto appended.

In the accompanying drawings:

FIG. 1 is an exploded view showing the arrangement of components within a coupling.

FIG. 2 is a bottom plan view of a novel grommet constructed in accordance with this invention.

FIG. 3 is a cross section taken along line 3—3 of FIG. 2.

FIG. 4 is a bottom plan view of a novel air disc constructed in accordance with this invention.

FIG. 5 is a side elevational view of the air disc of FIG. 4.

FIG. 6 is a top plan view showing an air disc applied to a grommet.

FIG. 7 is a cross section taken along line 7—7 of FIG. 6.

FIG. 11 is a cross section taken along line 11—11 of FIG. 2.

Figure 8:
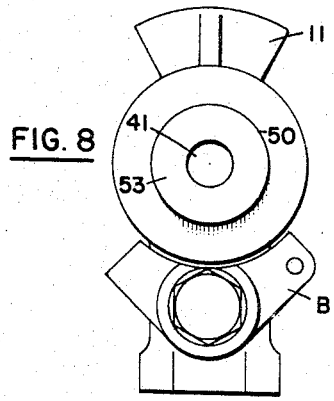
FIG. 8 is a bottom plan view of an air hose coupling member with air disc and grommet in position.

Although specific terms are used in the following description for the sake of clarity, these terms are intended to refer only to the particular structure of my invention selected for illustration in the drawings and are not intended to define or limit the scope of the invention.

The invention comprises a conventional right hand air hose coupling member generally designated A and a cooperating left hand coupling member generally designated B having disposed therebetween a plurality of air sealing members generally designated C. Each coupling member A, B provides an integrally formed, outwardly projecting locking ledge 10, 11 arranged to wedge within the respective receiving recess 12, 13 of the opposing coupling member to secure the respective air passages 14, 15 in aligned, sealed position. To make up the joint, ledge 10 of coupling member A may be introduced into recess 13 of coupling member B and ledge 11 of coupling member B may be introduced into recess 12 of coupling A. An opposite angular twist may then be applied to the respective coupling members until the forward edge 16 of ledge 10 contacts the angular stop 18 of member B and the forward edge 17 of ledge 11 contacts the angular stop 19 of member A. The angular displacement of the coupling member A, B serves to lock the members in operating position thereby compressing the air sealing members C therebetween and thus assuring an air-tight, leakproof joint.

Referring now to FIGS. 2, 3 and 11, I show a novel grommet 34 constructed preferably of hard resilient rubber comprising essentially a unitary body 20 of generally flat, cylindrical configuration. A concentric hole 21 through the body 20 permits the passage of air through the grommet after the coupling members A, B are aligned. The annular sealing flange 22 projects radially from the grommet body 20 and is spaced from the rearward seating flange 23 by a rectangular groove 24. The face 25 of the sealing flange 22 preferably tapers gently rearwardly to reduce scuffing, wear and possible damage to the grommet when the coupling members A, B are turned into aligned, sealing position. The seating flange 23 is concentric and generally circular in shape and projects radially flush with the rear of the grommet body 20. Identical, diametrically opposed cut-outs 26, 27 are removed from the flange 23 along equal, parallel cuts 28, 29 producing a flange having diametrically opposed arcuate surfaces 30, 31 respectively joined by straight parallel sides 32, 33. The cuts 28, 29 are spaced equally from the center of the grommet 34 and remove sufficient cut-out portions 26, 27 to provide opposed lips 35, 36 projecting beyond the base 37 of the rectangular groove 24. I have found that such a seating flange configuration readily lends itself to easy insertion into the locking recess 38 of the coupling members A, B. In order to lock the grommet 34 into operating position, one of the arcuate surfaces 30 of the seating flange 23 must be urged into the locking recess 38 of the coupling member A, B, taking care to assure that the sealing flange 22 faces outwardly. The opposed lips 35, 36 may then be readily worked into the recess 38 by flexing the grommet walls. The second arcuate surface 31 then easily inserts into the recess 38, thereby providing a secure connection. By eliminating the cut-out portions 26, 27 the operation becomes greatly simplified permitting seating of the grommet within the coupling recess without undue force, the need for special tools or the possibility of damaging the rubber body.

Similarly, in FIGS. 12, 13, 14, and 15, I show a mating grommet 39 comprising a resilient, hard rubber body 40 of generally cylindrical construction. A vertical hole 41, which is concentrically positioned, permits the passage of air from the coupling member B to coupling member A. The body 40 terminates downwardly in a flat seating flange 42 disposed at right angles to the axis of the grommet body 40. The flange 42 comprises diametrically opposed, concentric, arcuate faces 43, 44 respectively joined by straight, parallel sides 45, 46. The sides 45, 46 are spaced equally from the center of the grommet 39 thereby providing opposed lips 47, 48 which project beyond the base 49 of the grommet body 40 to secure the flange within the locking recess 38 of the coupling members.

Referring now to FIGS. 4 and 5, I show an air disc 50 preferably constructed of aluminum or brass and carefully machined and finished to remove all burrs and rough surfaces. The disc comprises a hollow cylindrical mounting shank 51 containing a longitudinal air passage 52 which is axially aligned. The shank terminates forwardly in a radially projecting sealing flange 53 and rearwardly in a radially extending seating rim 54. As seen in FIGS. 6, 7, the shank 51 of the disc 50 presses within the central air hole 41 of the grommet 39 until the inner surface 55 of the sealing flange 53 contacts the top 56 of grommet 39. The height of the shank 51 of air disc 50 corresponds to the height of the body 40 of the mating grommet 39 so that the disc rim 54 seats against bottom 57 of the seating flange 42 when the disc sealing flange 53 contacts grommet top 56 thereby providing a securely held combination when in operation. The circular junction 58 between the shank 51 and the sealing flange 53 is turned to a small radius to permit as great an area of contact as possible between the air disc 50 and the grommet 39 and also to eliminate sharp areas that could possibly damage the rubber when subjected to the extreme conditions of operation.

Figure 16:
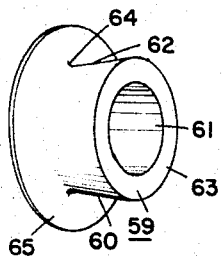
FIG. 16 is a perspective view of a modified air disc configuration.
Figure 17:
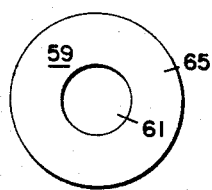
FIG. 17 is a front elevational view of the air disc of FIG. 16.
Figure 18:
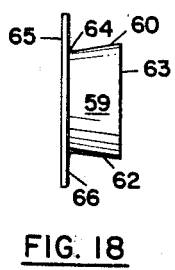
FIG. 18 is a side elevational view of the air disc of FIG. 16.

Referring now to FIGS. 16, 17 and 18, I show a modified type of air disc 59 wherein the need for a seating rim has been entirely eliminated. The disc 59 incorporates a hollow, generally cylindrical body 60 providing an air conduit 61 to permit the passage of air between coupling members A, B. The outer wall 62 tapers inwardly from the seating end 63 to the junction 64 between the body 60 and the radially projecting sealing flange 65. The junction 64 is turned in a small radius to provide a smooth transition between the flange 65 and the body 60. The modified disc 60 is intended to be inserted into the hole 41 of a grommet 39 in the same manner as hereinbefore described until the disc seating end 63 is pushed through the seating flange 42 and the bottom 66 of disc flange 65 contacts the top 56 of the grommet body 40. The tapered outer wall 62 of the disc tends to spread the grommet body 40 thereby assuring a tight fit while the angle of taper acts to prevent the grommet 39 and disc 59 from pulling apart upon operation.

Figure 9:
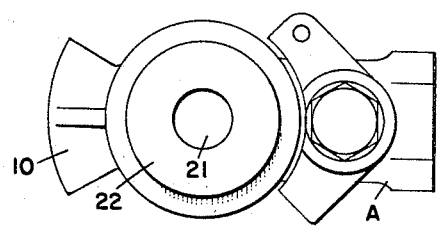
FIG. 9 is a bottom plan view of an air hose coupling member with a grommet in position.
Figure 12:
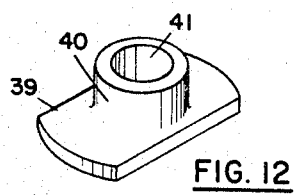
FIG. 12 is a perspective view of a novel grommet constructed in accordance with this invention.
Figure 13:
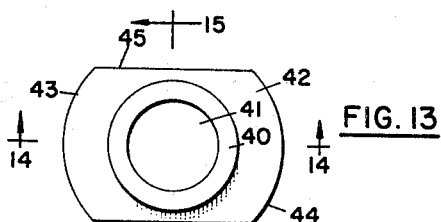
FIG. 13 is a top plan view of the grommet of FIG. 12.
Figures 14, 15:
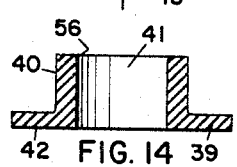
FIG. 14 is a cross section taken along line 14—14 of FIG. 13.
FIG. 15 is an end elevational view of the grommet of FIG. 12.
Figure 10:
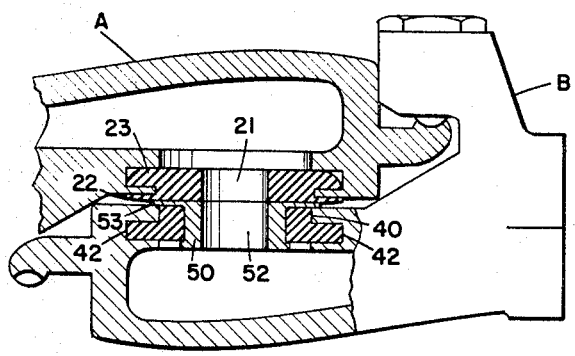
FIG. 10 is an elevational view partly in section showing the coupling members, grommets and air disc in position.

As seen in FIGS. 8, 9 and 10, the grommets 34, 39 seat securely within the respective coupling members A, B. The air disc 50 is pressed into the mating grommet 39 and strengthens and supports the said grommet. The inner surface 55 of the sealing flange 53 contacts the mating grommet 39 while the outer surface 67 contacts the sealing flange 22 of grommet 34 thus providing a sturdy rubber to metal to rubber air sealing contact.

In order to use my invention, the grommet 34 should first be seated in the locking recess 38 of coupling member A by working the seating flange 23 and the opposed lips 35, 36 into the recess 38 and exposing the sealing flange 22. The air disc 50 may then be pressed into the central hole 41 of the mating grommet 39 until the rim 54 seats against the bottom 57 of the seating flange 42. Grommet 39 should then be seated in the locking recess 38 of coupling member B by working the seating flange 42 and the opposed lips 47, 48 into the recess 38 and exposing the sealing flange 53. The joint may then be made up in the usual manner by inserting locking ledge 10 of coupling member A into the receiving recess 13 of coupling member B. Similarly, locking ledge 11 of member B should be applied to the receiving recess 12 of coupling member A. Once aligned as above, the members A, B may be oppositely axially rotated bringing the coupling members into tight alignment in the usual manner. The pressure exerted by the aligned coupling members A, B forces grommets 34, 39 to press together thereby sandwiching the sealing flange 53 of the air disc 50 therebetween.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. Air brake coupling sealing components for sealing the junction between cooperating coupling members having circular air outlets comprising
   (A) a first grommet engageable within one of said coupling members,
      (1) said grommet being fabricated of hard, resilient material,
      (2) said grommet having a generally flat, cylindrical body,
      (3) said grommet being provided with a concentric cylindrical air passage,
         (a) said air passage communicating with the said coupling air outlet, (4) said grommet having a seating flange at one end thereof and a sealing flange at the other end thereof,
  (a) said flanges extending radially from the said grommet body,
  (b) the said seating flange including a pair of diametrically opposed arcuate engaging tongues, and
  (c) the said seating flange including a pair of parallel, straight engaging lips,
    (1) said lips and said tongues being respectively peripherally connected,
    (2) said lips and said tongues contacting the interior of the said coupling air outlets,
(B) a second grommet engageable within the second of said coupling members,
  (1) said grommet being fabricated of hard, resilient material,
  (2) said grommet including a hollow cylindrical body defining an air passage therethrough,
    (a) said air passage communicating with the air outlet of the said second coupling member,
    (b) said body having relatively thick, stiff walls,
      (1) said body walls terminating at one end thereof in a radially extending seating flange,
        (a) said flange including a pair of diametrically opposed arcuate engaging tongues,
        (b) said flange including a pair of of parallel, straight engaging lips,
          (1) said lips and said tongues being respectively peripherally connected,
          (2) said lips and said tongues contacting the interior of the said coupling air outlet,
(C) non-resilient air sealing means interposed between the first and second grommets, said sealing means including second grommet stiffening means.

2. The invention of claim 1 wherein the outermost face of the said sealing flange tapers gently towards the said seating flange.

3. The invention of claim 1 wherein the bodies of the said grommets fit snugly within the air outlets of the said couplings and wherein all portions of the respective seating flanges lock within the said coupling air outlets.

4. The invention of claim 1 wherein the said stiffening means include a rigid, hollow cylindrical shank, said shank lining the air passage of the said second grommet, said shank terminating at one end thereof in the said air sealing means and at the other end thereof in a radially raised rim.

5. The invention of claim 1 wherein the said stiffening means include a rigid, hollow cylindrical shank, said shank lining the air passage of the said second grommet, said shank terminating at one end thereof in the said air sealing means and at the other end thereof in a radially raised rim, the said rim contacting the outer face of the said grommet seating flange and the said sealing means contacting the said grommet sealing edge whereby the said second grommet is tightly retained by the said stiffening means and the said sealing means.

6. The invention of claim 1 wherein the said air sealing means include a flat, rigid, circular disc, said disc being provided with a concentric central air opening, one flat side of said disc contacting the outer surface of the first grommet sealing flange and the other flat side of said disc contacting the said second grommet sealing edge, whereby a resilient to non-resilient to resilient seal is provided.

7. Air brake coupling sealing components for the sealing the junction between a pair of cooperating coupling members comprising
(A) a first grommet engageable in the first of said coupling members,
  (1) said grommet terminating outwardly in a flat, radially extending flange,
(B) a second grommet engageable in the second of said coupling members
  (1) said grommet terminating outwardly in a sealing edge,
    (a) said edge being a smaller diameter than said flange,
(C) non-resilient air sealing means interposed between the first and second grommets, said air sealing means including attached second grommet stiffening means.

8. The invention of claim 7 wherein the said flange contacts one side of the said air sealing means and the said second grommet sealing edge contacts the second side of said air sealing means.

References Cited

UNITED STATES PATENTS

| | | | |
|---|---|---|---|
| 259,369 | 6/1882 | Clay et al. | 277—168 X |
| 682,873 | 9/1901 | Joy | 285—379 |
| 857,106 | 6/1907 | Perdergast | 285—379 |
| 1,065,515 | 6/1913 | Ewert | 277—178 X |

FOREIGN PATENTS

| | | |
|---|---|---|
| 965,771 | 8/1964 | Great Britain. |

SAMUEL ROTHBERG, *Primary Examiner.*